United States Patent [19]

Lehmann

[11] 4,326,737
[45] Apr. 27, 1982

[54] TUBE COUPLING ASSEMBLY

[75] Inventor: Ernesto Lehmann, Schaffhausen, Switzerland

[73] Assignee: Georg Fischer Aktiengesellschaft, Schaffhausen, Switzerland

[21] Appl. No.: 123,204

[22] Filed: Feb. 21, 1980

[30] Foreign Application Priority Data

Feb. 23, 1979 [CH] Switzerland .......................... 1799/79

[51] Int. Cl.³ .............................................. F16L 17/06
[52] U.S. Cl. ..................................... 285/112; 285/365; 285/373; 285/423; 285/DIG. 11; 285/DIG. 22
[58] Field of Search ............... 285/423, DIG. 22, 373, 285/419, 364, 406, 365, 407, 112, DIG. 12, DIG. 11

[56] References Cited

U.S. PATENT DOCUMENTS

| | | | |
|---|---|---|---|
| 3,235,293 | 2/1966 | Condon | 285/423 X |
| 3,321,298 | 1/1956 | Tomb et al. | 285/365 X |
| 3,524,662 | 8/1970 | Tolman et al. | 285/415 X |
| 3,633,947 | 1/1972 | Nelson | 285/423 |

FOREIGN PATENT DOCUMENTS

| | | | |
|---|---|---|---|
| 1023281 | 1/1958 | Fed. Rep. of Germany | 285/112 |
| 1258682 | 1/1968 | Fed. Rep. of Germany | 285/364 |
| 2227911 | 3/1973 | Fed. Rep. of Germany | 285/373 |
| 429331 | 7/1967 | Switzerland . | |
| 538626 | 8/1973 | Switzerland | 285/365 |
| 1118356 | 7/1968 | United Kingdom | 285/364 |

*Primary Examiner*—Dave W. Arola
*Attorney, Agent, or Firm*—Toren, McGeady & Stanger

[57] ABSTRACT

A coupling assembly for joining together the ends to a pair of tubes, particularly suitable for use with plastics material, includes a pair of flange bushings, a sealing arrangement effecting a centering function and two semicircular shells having a U-shaped inner cross-sectional profile, each of the shells being provided with a resilient pawl which joins the shells together circumferentially about the coupling assembly. The sealing arrangement includes a centering ring and an inner sealing ring with the outer diameter of the centering ring performing in cooperation with the inner contour of the shells a centering function for the sealing arrangement. This centering function prevents displacement of the sealing arrangement during assembly and operation and permits the utilization of different types of seals and of smooth end faces of the flange bushings.

12 Claims, 6 Drawing Figures

TUBE COUPLING ASSEMBLY

BACKGROUND OF THE INVENTION

This invention relates generally to an assembly for coupling together the ends of a pair of tubes, the assembly being particularly suitable for use in coupling tubes made of plastic material.

The assembly of the invention generally relates to the type of assembly having two flange bushings with a flange angle of approximately 90°, a sealing arrangement with centering means and a pair of identical, semicircular shells having U-shaped cross-sectional profiles each with a resilient pawl or latch.

Tube couplings similar to those of the present invention are known in the prior art, for example, from Swiss Pat. No. 429,331. These couplings generally consist of two flange bushings with cylindrical flanks and of two semicircular rings having a semitoroidal central part and a semitubular flange which are held together by means of conical rings. Although these devices may generally give good results, correct dimensioning may cause certain difficulties. In the case of inaccurate or coarse tolerances, considerable forces may be transmitted by means of the conical rings. Without snap or catch grooves, frictional coefficients which may vary widely may affect the safety of the wedging or engagement characteristics.

Another embodiment of a tube coupling known in the prior art is known from Swiss Pat. No. 538,626. In this prior art device, the end face of a flange has annular grooves which partially surround a sealing ring that is located therebetween, the grooves being arranged directly adjacent the interior wall of the tube wherein there is a small gap between the tube ends and wherein the rear sides of the flange are surrounded by a clamping ring. The tube connection is characterized in that the back sides of the flange and the appropriate contact surfaces of the clamping ring form an approximate right angle with the longitudinal axis of the tube. The clamping ring is elastic and it is held together with locking devices formed by means of recesses in the clamping ring. This type of construction gives rise to a limitation with regard to the selection of the type of sealing rings.

Also, exact adjustment of the dimensioning of the sealing ring is necessary. While for actual clamping of the clamping ring over the flange, a plastics material with a modulus of elasticity that is as high as possible would be desirable-especially since this type of tube coupling is provided for steel tubes—there is simultaneously involved the desirability of providing a plastics material with a low modulus of elasticity in order to enhance the release of the safety groove.

The present invention is directed towards providing a tube coupling of the type previously mentioned, particularly with reference to Swiss Pat. No. 538,626, which involves a structure enabling economical manufacturing thereof, which is well adapted to utilization with plastics materials, which exhibits space-saving characteristics and which provides a positive and safe locking function while being capable of being radially dismantled.

A further aim of the invention is the provision of a structure for a tube coupling involving self-centering characteristics whose function does not depend upon the tolerances involved and which may be installed and removed in the radial direction without axial displacement of the tubes.

SUMMARY OF THE INVENTION

Briefly, the present invention may be described as a coupling assembly for joining together a pair of tube ends, particularly suitable for use with tubes made of plastics material, comprising a pair of flange bushings having a flank angle of approximately 90°, a sealing mechanism adapted to effect a centering function and including a pair of generally identical semicircular shells each having a generally U-shaped cross-sectional profile and resilient pawl means for circumferentially joining said shells together about said tube ends, said centering function of said sealing mechanism being effected by cooperative engagement between the outer diameter of the sealing mechanism and the inner contours of the shells.

By centering the sealing arrangement at the end contour of the shells, radial installation and dismantling of the seal is possible without requiring axial displacement of the tubes or of the flange bushings. At the same time, due to the planar end faces of the flange bushings, a favorable type of seal may be selected for each application.

Due to the rigid connection of the supporting ring and the sealing ring, simple assembly and accurate centering of the seal is achieved.

The resilient pawls whereby each of the semicircular shells are connected together ensure a safe and fast connection of the tube coupling.

The transition portions of the shell interiors are formed with radii which are dimensioned in a specified ratio relative to the size of the tube, and a configuration is provided which is particularly suited for use with plastics material and which may be manufactured as an injection molded component. The semicircular shells thus formed will exhibit good bending resistance and will provide a rigid connection with the resilient pawls enabling the overall assembly to be easily put together.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
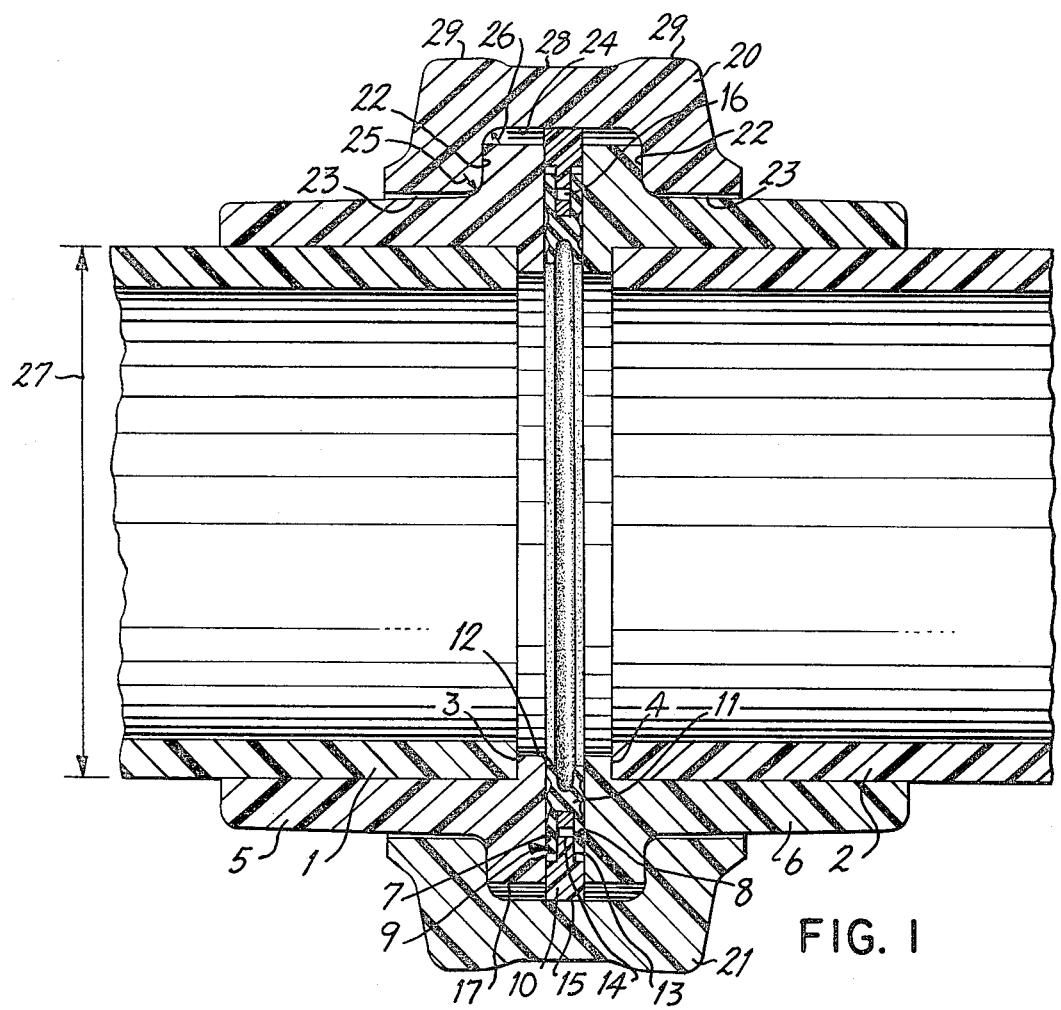
FIG. 1 is an axial sectional view of a first embodiment of a tube coupling assembly in accordance with the present invention.
Figure 2:
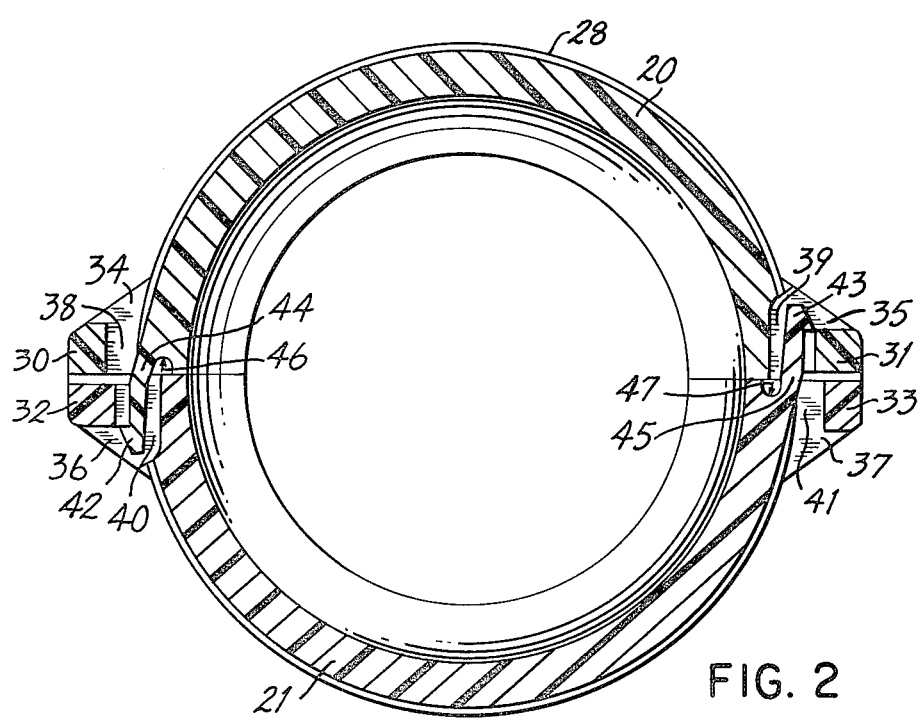
FIG. 2 is a cross-sectional view showing a pair of the semicircular shells of the invention depicted in the locked condition as shown in the embodiment of FIG. 1.

Referring now to the drawings wherein like reference numerals are used to refer to similar parts, a preferred embodiment of the invention is shown particularly in FIGS. 1 and 2 wherein the ends 1 and 2 of a pair of tubes made of plastic material are joined, welded or glued to two flange bushings 5 and 6, the ends of the tubes being in abutment with stop surfaces 3 and 4 of the flange bushings 5 and 6.

If polyvinylchloride (PVC) is used as the material, then glueing is preferred.

The two flange bushings 5 and 6 are each formed with planar end faces 7 and 8 and a sealing arrangement 9 is located between the faces 7 and 8, the sealing arrangement 9 being particularly suitable for a tube coupling where more exacting requirements are involved. The sealing arrangement 9 consists of an outer centering ring 10 with a T-shaped profile and of an inner sealing ring 11 with lip seals 12 extending in the direction toward the interior of the coupling, the lip seals being constructed with a generally U-shaped cross-sectional profile. The sealing ring 11 includes a circumferential groove 13 at the outer diameter thereof. A radial web 14 of the centering ring 10 engages into the circumferential groove 13 of the sealing ring 11.

The sealing ring 11 consists of an elastomer material and the centering ring 10 may, depending upon its area of application, be formed of a harder elastomer material. Additionally, the centering ring 10 may be made of a thermoplastic material, a thermosetting plastic with or without fiber reinforcement or of metal, wherein it will protect the sealing ring 11 against yielding under interior pressure with its outer diameter 15 forming a part of the centering function for the sealing arrangement 9. In this way, tacking of the sealing ring 11 with adhesive during the assembly operation may be omitted and the danger of softening or embrittlement of the PVC due to adhesive remainders will also be prevented.

In an especially advantageous embodiment of the invention, the sealing arrangement 9 is formed with openings or bores 16 arranged in the radial web 14 of the centering ring 10. An elastomer may then be sprayed or pressed around the web 14 in order to form the sealing ring 11, with the opening thus being filled with the elastomeric material. This will result in a locked connection being formed between the centering ring 10 and the sealing ring 11 and there will also be established good reinforcement of the latter.

Of course, other embodiments of a sealing mechanism or arrangement are possible and, for example, an O-ring with an appropriate centering ring, concentric multiple-ring seals with appropriate centering, and a square ring or a ring with a square cross-sectional area with a centering function may be provided.

In order to establish connection of the two tube ends 1 and 2, the tube coupling assembly is formed with a pair of semicircular shells 20 and 21 which have a U-shaped cross-sectional profile. The inner contour of the U-shaped sectional profile consists of a pair of flanks 22 which are arranged to extend generally perpendicularly in the longitudinal axis of the tubes with an intermediate surface 24 extending therebetween and lying approximately in a plane parallel to the axis of the tubes. Additionally, a pair of lateral outer circumferential surfaces 23 are also provided.

The transitions between the flanks 22 and the circumferential surfaces 23 and 24 are formed with radii 25 and 26 which are purposely designed to be rather large in dimension. A preferred dimensional value for the radii 25 and 26 is about 0.02×the nominal diameter 27 of the tube connection. The nominal diameter 27 corresponds to the outer diameter of the tubes which are to be connected by the tube connection assembly of the present invention. The minimum dimension of the radii 25 and 26 should be about 0.015×the nominal diameter 27. The outer profile of two U-shaped shells 20 and 21 should also have a rather large influence on the construction and at each edge a raised portion 29 is provided which automatically causes the formation of a generally well rounded groove or indentation 28 in the center of the shells 20,21.

In the embodiment shown in FIG. 1, the sealing arrangement 9 projects from the assembly beyond the outer diameter 17 of the flanged bushings 5 and 6 and is centered by the inner contour of the shells 20 and 21, the centering being effected by the inner circumferential surface 24. The outer diameter 15 of the centering ring 10 is equal in size or slightly smaller than the inner diameter of the circumferential surface 24.

In FIG. 2, the two shells 20 and 21 are shown in cross-section and here also a groove or indentation 28 is visible.

In FIG. 2, the operation or function of the pipe assembly connection is shown with somewhat greater clarity and the two U-shaped shells 20 and 21 can also be seen in somewhat greater detail.

At the ends of the shells 20 and 21, there are arranged perforated plates 30,31 and 32,33. On a side of each there is provided a rib 34,35,36,37, respectively. Oblong openings 38,39,40,41 are arranged and in each of the oblong openings a locking resilient pawl 42 or 43 engages and secures the two shells 20 and 21 together in a circumferential direction thereby operating to consequently hold together the entire tube connection assembly.

Special attention should also be directed toward the design of the transition, identified as root 44 and 45, of the resilient pawl 42,43 to the shell 20 or 21. This transition at the root 44,45 must be designed with a relatively large radius 46 or 47. A preferred dimension for this radius is 0.0125×the nominal diameter 27 (FIG. 1). As a minimum, the radius dimension should be no less than 0.01×the nominal diameter 27.

It has been found favorable to arrange each of the roots 44,45 of the pawls 42,43 in a recessed manner.

Figure 3:
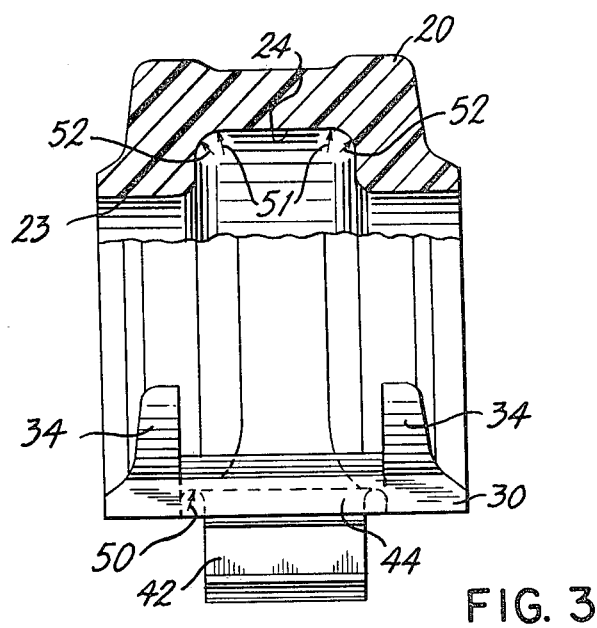
FIG. 3 is a partial sectional view showing in greater detail the semicircular shells of the invention.

In FIG. 3, the upper part of the tube assembly shown in cross-section corresponds to the cross-sectional view of FIG. 1 with a design variation of the inner contour being depicted. The lower portion shows the plate 30, the ribs 34 and the pawl 43 in elevation. Here again, the root 44 of the pawl 42 is arranged in a recess with defined radii 50.

For optimization of the durability and the alternating bending resistance of the elements, an improvement in the profiled design of the bottom of the U-shaped groove has been described. The U-shaped groove has on both sides thereof a hyperbolically shaped, smooth transition portion extending from the circumferential surface 24 to the flank 22. This ideal profile may also be achieved provisionally by two radii 51 and 52 each in the bottom of the groove.

The radii 52 adjoining the flanks 22 correspond to the radii 26 shown in FIG. 1, with a preferred dimension thereof being 0.02×the nominal diameter 27.

Figure 4:
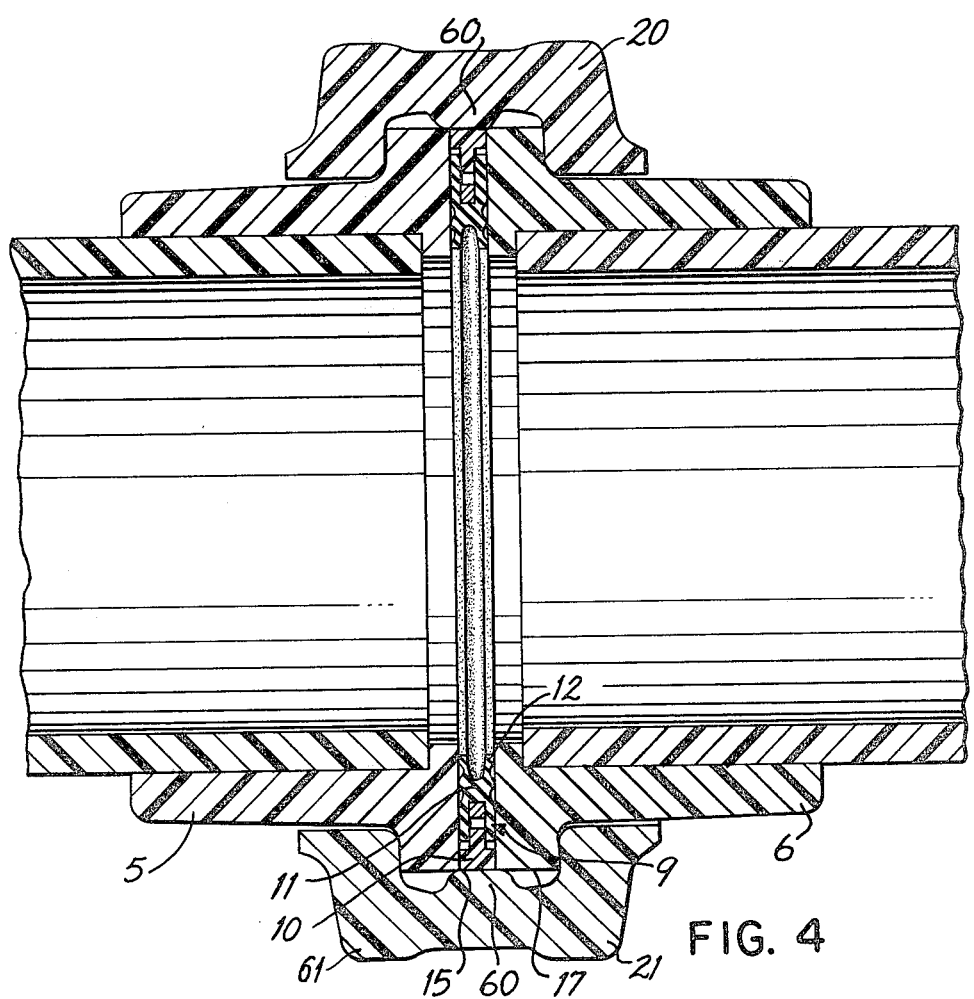
FIG. 4 is an axial sectional view of the coupling assembly in accordance with the invention.

In a variation in the design of the tube coupling assembly of the invention shown in FIG. 4, the two shells 20 and 21 have at their inner periphery a rib 60 which extends in the circumferential direction. The width and the inner diameter of the rib 60 may be dimensioned so that the two shells 20 and 21 will be centered on the outer diameter 17 of the flange bushings 5 and 6. In this modification of the invention, the centering ring 10 of the sealing arrangement 9 will have an outer diameter 15 which corresponds to the outer diameter 17 of the flange bushings 5 and 6, whereby the rib 60 will simultaneously form the centering element for the sealing arrangement 9. At the same time, the two shells 20,21 are reinforced at the outside thereof with a bulge 61 which enhances the bending resistance of the shells. This will also ensure that at high pressure a more effective seal of the tube connection is formed.

Depending on the shape of the profile of the centering ring 60, it may be capable of operating only to guide the sealing arrangement 9. The rib 60, however, may at the same time provide higher static strength or rigidity to the shells 20 and 21.

Figure 5:
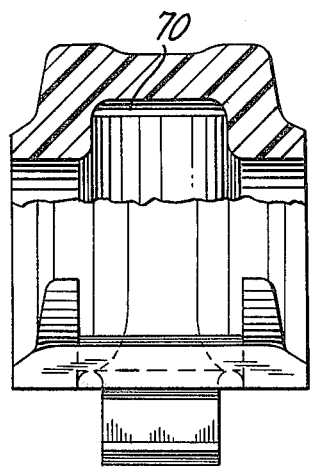
FIG. 5 is a partial sectional view of a further embodiment of the invention.
Figure 6:
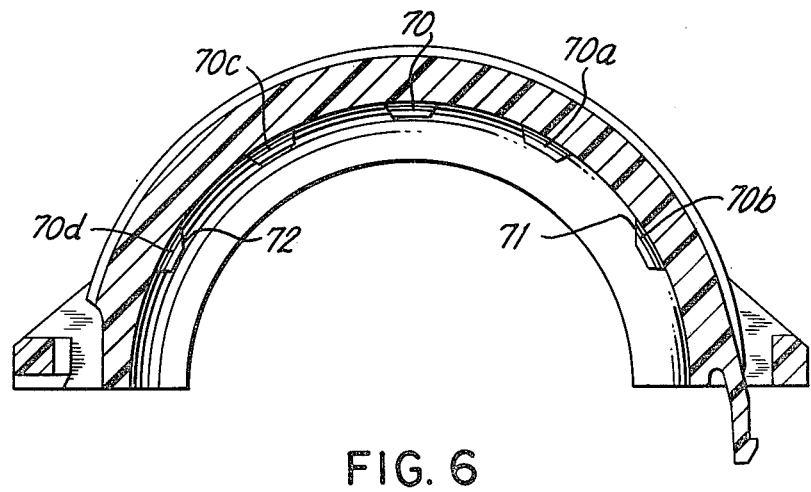
FIG. 6 is a cross-sectional view of the embodiment shown in FIG. 5.

A different type of design for the centering ribs is depicted in FIGS. 5 and 6. In the embodiment depicted therein the U-shaped inner contour of the shells 20,21 is formed with axially extending ribs 70,70a,70b,70c,70d. These ribs give the sealing arrangement 9, as well as the flange bushings 5 and 6, a rim centering capacity and they act at the same time as reinforcing ribs for the shells. The flanks 71 and 72 of the ribs 70d are designed parallel due to the necessity for enabling removal of the parts from a mold in which they are formed. It is also possible to design the rib 60 shown in FIG. 4 as an uninterrupted circumferential rib. Thus, another design variation may result by combining the design concepts in accordance with FIG. 4 with the concepts depicted and exemplified in FIGS. 5 and 6.

With a centering function performed in accordance with the invention on the sealing arrangement at the inner contour of the shells, special grooves for the seals of the flange bushings may be omitted and a more favorable type of sealing mechanism for the desired application may be selected.

The finer details of the design of the structure described in FIGS. 1 and 3 are the result of extensive experimentation particularly involving time-consuming creep tests. Careful design of the radii of the various elements enables the invention to provide a shape and configuration that is well suited for utilization with plastic material. With correct distribution of the wall thicknesses, the invention also enables an economical manufacturing method that is adapted to utilization of injection molding techniques. With the slender type of construction involved, the invention is also capable of making possible an assembly which may be performed at a construction site with space-saving parts that are easy to handle.

The most important parts of the assembly of the invention, such as the flange bushings and the shells, are in identical pairs and they may be exchanged with other similar parts. This results in uniformity of the parts and in the utilization of more economical injection molding techniques.

The tube coupling assembly in accordance with the present invention is also especially suitable for utilization in a construction wherein it is wrapped with fibers such as, for example, glass, carbon, stretched thermoplastic materials, prefabricated reinforced adhesive tapes, etc. which will increase the strength of the assembly and wherein the fibers may again be cut when the coupling assembly must be disassembled or opened.

While specific embodiments of the invention have been shown and described in detail to illustrate the application of the inventive principles, it will be understood that the invention may be embodied otherwise without departing from such principles.

What is claimed is:

1. A coupling assembly for joining together the ends of a pair of tubes, particularly tubes made of plastic material, comprising: flange bushings defining a pair of planar radial flanks extending generally perpendicularly to the center lines of said pair of tubes and means attaching said bushings to said tubes; sealing means sealingly engaging said radial flanks, said sealing means having a generally annular configuration and an outer circumferential face; said radial flanks and said annular sealing means being structured so that said annular sealing means are held axially fixed between said radial flanks but radially adjustably movable relative thereto to allow for radial adjustment in the position of said sealing means; said outer circumferential face of said sealing means having a diameter which is at least as large as the outermost diameter of said radial flanks; and annular clamping means extending circumferentially about said flange bushings and said sealing means to provide a radial clamping force and to circumferentially engage said sealing means to effect radial adjustment of the position thereof; said clamping means comprising a pair of generally semicircular shells, resilient pawl means for circumferentially joining said shells together and radially inner engaging means for engaging said outer circumferential face of said sealing means to effect radial positioning thereof; said sealing means including an outer centering ring having a T-shaped profile, and an inner sealing ring with a lip seal directed radially inwardly of said assembly and formed with a U-shaped profile, with a radial web being provided on said centering ring, said radial web engaging in an outer circumferential groove of said sealing ring.

2. A coupling assembly according to claim 1 wherein the diameter of said outer circumferential face and the outermost diameter of said radial flanks are approximately equal.

3. A coupling assembly according to claim 1 wherein said inner engaging means of said semicircular shells include at the inner circumference thereof rib means comprising at least one rib wherein said rib means together with the outer circumferential face of said flange bushings operates to effect a centering function of said sealing means.

4. A tube coupling assembly according to claim 3 wherein said rib means of each of said shells is arranged to extend in the circumferential direction thereof.

5. A coupling assembly according to claim 4 wherein said rib means extend in the circumferential direction in an interrupted configuration.

6. A coupling assembly according to claim 3 wherein said rib means extend in the axial direction.

7. A coupling assembly according to claims 1, 2, 3, 4 or 5 wherein said semicircular shells include at both ends thereof a plate member having an oblong opening and wherein said resilient pawl means comprise a resilient pawl located at an end of each of the shells which engages through said oblong opening.

8. A coupling assembly according to claim 1 wherein said semicircular shells have a generally U-shaped cross-sectional profile defined by a pair of flanks extending generally perpendicularly to the axis of said tubes, a pair of axially extending lateral circumferential surfaces each extending axially from one of said flanks and an intermediate lateral circumferential surface extending between said flanks, and wherein said tube ends have a nominal outer diameter, the transitional surfaces between each of said flanks, said axially extending surfaces and said intermediate surface being formed with a radius not smaller than 0.02×said nominal diameter.

9. A coupling assembly according to claim 8 wherein said resilient pawl means includes resilient pawls extending from said shells, and wherein the transition areas between said resilient pawls and said shells are formed with a radius not smaller than 0.01×said nominal diameter.

10. A coupling assembly according to claim 8 wherein the transitional surfaces extending between said flanks and said intermediate circumferential surface are formed with a hyperbolic shape and consists of a first larger radius and a second smaller radius.

11. A coupling assembly according to claim 1 wherein said flange bushings and said semicircular shells are manufactured by an injection molding process.

12. A coupling assembly according to claim 1 wherein said centering ring consists essentially of one of the materials metal, thermosetting plastic, and theremoplastic material, and wherein said radial web is formed with openings extending therethrough with said inner sealing ring consisting of an elastomer material that is applied around said web and which subsequently hardens whereby said elastomer material extends through said openings in holding engagement therewith.

* * * * *